The specification of this patent is not in print.

9047X

PATENTED AUG. 20, 1835.

H. HUNSICKER & J. KRAUSS.
BRICK PRESS.

THE MORRIS PETERS CO., WASHINGTON, D. C.

9047X Aug. 20. 1835

Henry Hunsicker and Joel Krauss, of Northamton Borough, Penn.

Letters Patent

The Schedule referred to in these Letters Patent and making part of the same containing a discription in the words of the said Henry Hunsicker and Joel Krauss themselves of their improvement in a machine for pressing and finishing Bricks.

Figure 1:
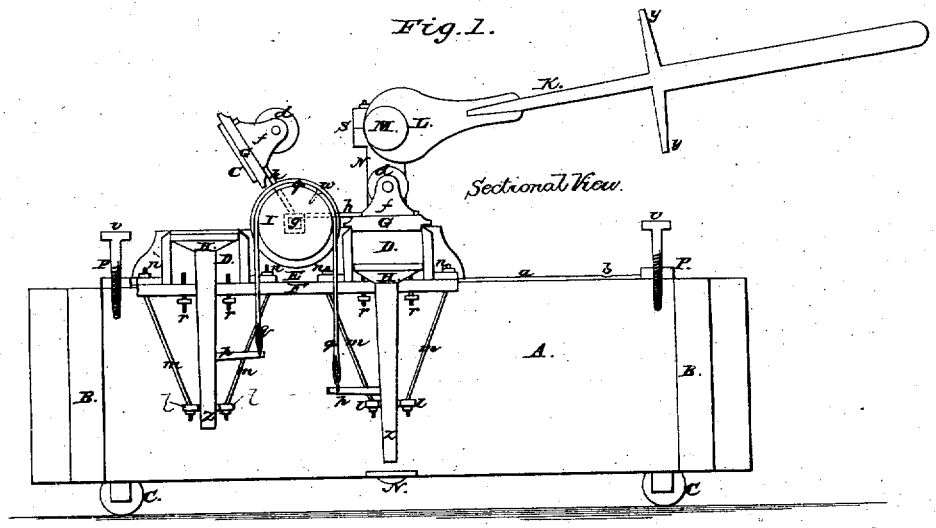

To all to whom these presents shall come. Be it known that We Henry Hunsicker and Joel Krauss. of the Borough of Northamton in the County of Lehigh and State of Pennsylvania have invented a new and usefull machine for pressing and finishing Brick and that the following is a full and exact description of the same as invented by us. In the annexed drawing fig 1. is a vertical longitudinal section of the machine. through the centre A shows one of the side pieces of which there are two, about 4 feet long 13 inches broad and placed about 10 inches inside apart. they constitute the foundation of the machine. have cross ties at B.B. and are placed upon truck wheels C.C so as to render the machine portable. D.D are a pair of cast iron brick moulds cast in one piece the side E which connects them together being cast with a projection or flange E' on the inner side that projects internally over the bottom edge of the moulds & externally forms a shoulder that fits on the tops of the two iron ways or bars a. secured on the tops of the side pieces on which the moulds are made to slide so as to bring them alternately under the operation of the pressing lever herea fter mentioned. for the purpose of diminishing the friction to stop the moulds at the proper points of the rail. small friction Rollers i i are let into the bottom of the moulds on each side, which drops in to the depressions or notches b.b. so that the moulds may rest solid on the rails while the brick is pressing. G.G. represent the covers of the moulds each having a follower c. that ~~[illegible]~~ enters the mould a short distance. and on the top a friction roller d. that bears on a strong pin or shaft e. passing through bearing f cast solid with the cover. which rollers which receive the pressure from the pressing lever. g is a centre shaft which bears in suitable boxes placed on the middle of the top edge of the connecting sides of the moulds E', h.h are two fixed arms of which there are two to each mould cover. which proceed from said shaft making an angle of about 120° with each other and are secured to the tops of the covers by screws or rivets. the object of which arrangement is to cause either cover to rise when the opposite one is depressed by the lever. H.H. are the pistons. the feet I.I. of which pass through the guides i.i. in

Figure 2:
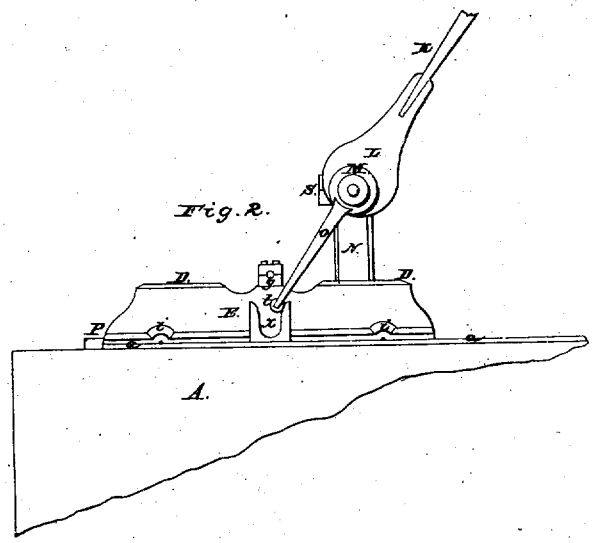

9047X cured to the bottom of the moulds by brace Rods m. m. and screws and nuts n. n. by which
they can be regulated. a rectangular strut or arm p. proceeds from each piston foot to
which is connected a chain that passes over a fixed pulley I. on the centre shaft. the
effect of which arrangement is that these pistons will rise or fall as their respective cov
ers are raised or depressed. the length of the chain q is such that the piston is not
supported thereby whilst the brick is pressing but bears with its underside on
the adjusting screws r. r. passed up through the flange E a screw or pin w being
inserted in the top of the pulley I to prevent the chain from slipping. K represents
the pressing lever which is of wrought iron 3 or 4 feet long but may be of a length
proportionable to the required pressure. it is attached to a double excentrick or
cam L cast with a strong shaft M that bears in appropriate boxes S.S. secured
to the tops of substantial iron uprights N. let into and screwed to the outsides of the
side pieces and which for greater firmness are branched and screwed near the upper
edges of said pieces. from one end of the shaft M descends as seen in fig 2<sup>d</sup> a straight
arm O with a friction roller t in the end of it that works in a notch X formed
by 2 cogs cast solid on the outside of the connecting portion E of the moulds the
office of which is to slide the moulds back and forth by the motions of the lever bring
ing them alternately under its pressure. To arrest the pressure of the lever at the proper
or useful point a cross bar P is secured to the top of the side pieces A at each end of the
machine having a long screw v. in the centre with a broad head which may be
elevated or depressed, Two stops y. y. being attached to the lever the ends of which
strike on the heads of the screws v. and check the further descent of the lever.

Operation, the bricks being moulded and prepared for pressing in the common
way a brick is placed in the piston of the open mould. the lever K. is then drawn
towards that mould and by the operation of the arm O the mould and brick is brought
under the cam shaft M. by the progressive joint operation of the cam L, and arm
O, the cover of the mould containing the brick having been closed, and its piston de
pressed so as to bear on the screws r. r. whilst the cover of the opposite mould by
the same operation has been raised and its piston elevated on the lever K. being still
further depressed the arm O disengages immediately from the notch x leaving
the moulds at rest and the cam commences to press on the friction roller d of the cover and contin
ue to operate more and more powerfully until the stop y strikes the head of the
screw v. and the pressure is finished. a second brick is now placed in the opposite

90477X mould and the lever K being carried over towards that side of the machine operates on it in a similar manner to that first described at the same time raising the cover and piston of the first mould and discharging the first brick which is to be replaced whilst the pressure of the second is completing and the operation is thus repeated with greater economy of time and labour than in any machine hitherto used. although we have described an arm O whereby to shift or slide the moulds we propose to effect the same thing by a semicircular cog wheel at the place where the arm O is working in a cogged slide at the outside of the moulds though we prefer the arm for its simplicity. but what we do claim in our machine as principles for which we ask letters Patent is the plan of a double pressure or connected covers of the double moulds and the friction rollers which are let into the bottoms of the moulds, and the arms or cog wheels on the cam shaft. by the simultaneous operation of all which through the motion of the pressing lever or cam shaft alone the bricks are pressed and discharged and the moulds brought under the pressure of the cam in regular alternation. We claim also the substantial iron uprights where the cam shaft rests on. In testimony that the foregoing is a true specification of our invention we have hereunto set our hands this 20 day of July 1835. The above machine is to be made to press the bricks edgeways as well as flat if required Witnesses
Charles S. Hussey
John F. Krouse.

Henry Hunsicker
Joel Krauss.

Exd. MC (Drawing)

377 words